Dec. 27, 1960  G. L. EATON  2,966,396
PYROLYSIS OF AMMONIA BASE WASTE SULFITE LIQUOR
Filed Sept. 6, 1957
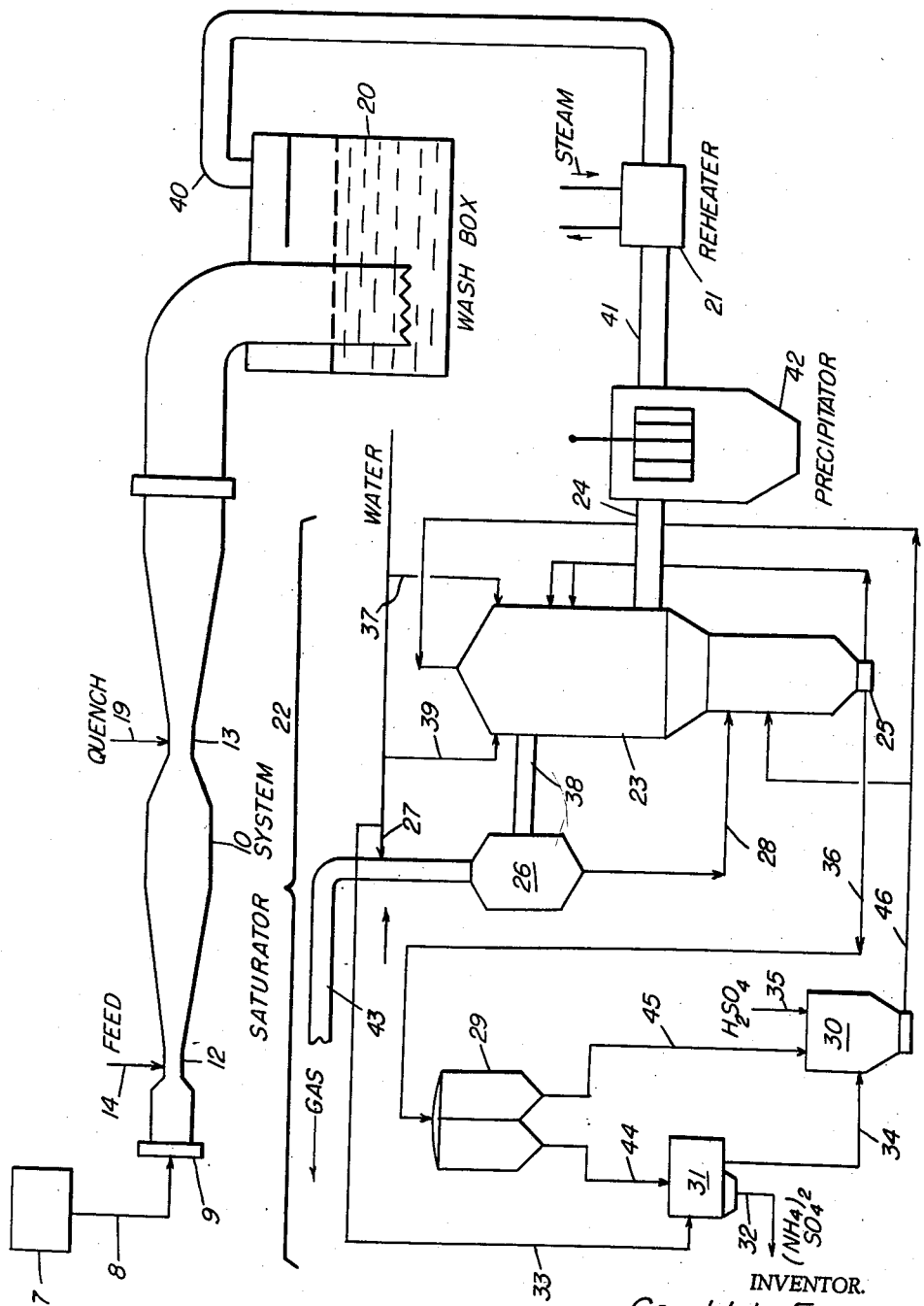
INVENTOR.
Gerald L. Eaton
BY his attorneys
Howson and Howson.

United States Patent Office 2,966,396
Patented Dec. 27, 1960

2,966,396

PYROLYSIS OF AMMONIA BASE WASTE SULFITE LIQUOR

Gerald L. Eaton, Philadelphia, Pa., assignor to United Engineers & Constructors Inc., Philadelphia, Pa., a corporation of Delaware Filed Sept. 6, 1957, Ser. No. 682,500

7 Claims. (Cl. 23—197)

This invention relates to a process and apparatus for the pyrolysis of ammonia base waste sulfite liquors and solid material derived therefrom and in particular to a process and apparatus for the pyrolysis of ammonia base waste sulfite liquors by means of which the recovery of a maximum amount of ammonia is made possible.

In the production of cellulose pulp by the ammonia base sulfite process, wood chips are digested with ammonium sulfite.

During digestion a liquor is produced which contains about 50% of the weight of the original wood and substantial quantities of sulphur and ammonia. While the exact form in which the ammonia and sulphur exist is not fully known, they are believed to be present, at least in large part, as the ammonium salts of lignin sulphonic acids and sugars. A possible skeletal structure [1] of these lignin sulphonic acids is

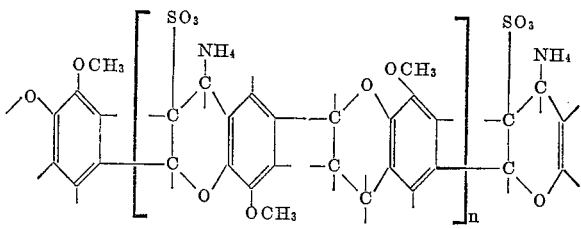

[1] Markham et al.: Paper Trade Journal 127, No. 1, TAPPI Section, p. 299.

The desirability of recovering the ammonia and sulphur from the liquor has long been realized. It has also been realized that the ligneous material present in the liquor could advantageously be used as fuel. The difficulty has been, however, that at temperatures which are sufficient to remove ammonia from the lignin compounds in which it is found, and in particular at temperatures sufficient to pyrolyze the ligneous material, the ammonia decomposes and can no longer be recovered.

It is an object of the present invention to provide an economical and practical method and apparatus for the pyrolysis of sulfite waste liquir.

It is another object of the invention to provide a method and apparatus for the pyrolysis of ammonia base sulfite waste liquor will permit maximum quantities of ammonia to be recovered.

It is a further object of the invention to provide a method and apparatus for the pyrolysis of ammonium sulfite liquor in which decomposition of ammonia derived from the waste liquor is substantially avoided.

In accordance with the invention these and other objects are attained by mixing the ammonia base waste sulfite material with a moving stream of high velocity gases having a temperature between about 1500° F. and 4000° F. and thereby atomizing, vaporizing and pyrolyzing said liquor, and forming a combined stream of gases and pyrolyzed liquor having a temperature between about 1000° F. and about 1800° F., then cooling or quenching said combined stream and recovering ammonia therefrom.

By a "high velocity" gas stream is meant one having a velocity sufficiently high to maintain the sulfite material suspended in the stream in a turbulent disperse phase and substantially uniformly distributed across the cross section of the stream. Such velocity will be at least 200 ft./sec. and normally between about 200 ft./sec. and about 700 ft./sec. Under these conditions, a sufficient amount of heat can be transferred uniformly and rapidly to the sulfite material to achieve uniform decomposition and pyrolysis. At the same time, depending on the pyrolysis temperature desired, the contact time can be made almost arbitrarily short, between about 0.01 and about 1.0 second, preferably between about 0.1 and about 0.5 second. By controlling the time at which the material is maintained at high temperatures, the decomposition of the ammonia is prevented, i.e. the dissociation reaction $2NH_3 \rightleftharpoons N_2 + 3H_2$ is prevented from approaching equilibrium, and thus a maximum amount of ammonia is obtained as product.

As well as $NH_3$, the product stream of the present process may include sulfur, obtained as $SO_2$ and $H_2S$, various materials such as oily liquids and gases and a finely divided char which has good fuel value. The precise composition of the product stream will depend on the conditions of pyrolysis employed.

In carrying out a preferred embodiment of the invention, a hot gas is passed at high velocity through a conduit having a Venturi throat or equivalent constriction, and the waste material is fed into the stream of hot gases at the constriction. The impact of the high velocity gases in the throat atomizes the feed. After the combined stream of feed and hot gas has reached a temperature sufficient to pyrolyze the feed, but before the ammonia released from the feed has had the opportunity to dissociate to any considerable extent, the combined stream is quenched. Preferably quenching is accomplished by passing the stream through another Venturi constriction in the conduit, where a quenching medium is introduced. In quenching, the temperature of the products of pyrolysis and the hot gas is reduced to below that at which dissociation of ammonia is of major importance, i.e. to below about 1000° F., preferably to below about 800° F. The quenched stream may then be further treated for the recovery of its individual components.

While a Venturi device as described above is preferred for quenching the product stream, it will be appreciated that other types of quenching equipment may be used, as desired.

In its apparatus aspects, the invention thus comprises a conduit having at least one Venturi or equivalent constriction, quenching means, one end of the conduit emptying into the quenching means, means for introducing a hot gas at high velocity at the other end of the conduit and means for introducing material to be pyrolyzed into the conduit at the constriction.

The composition of the hot gas with which the waste material is mixed may vary widely. High temperature products of combustion, such as hot flue gases from a gas or oil burner, may be used either alone or in admixture with steam. A slightly oxidizing atmosphere is desirable to suppress formation of $H_2S$.

The hot gas will be at a temperature of between about 1500° F. and about 4000° F., preferably between about 2500° F. and about 4000° F. From about 0.1 to about 10 pounds of gas per pound of feed will be used, the exact proportion depending on the temperature and heat capacity of the gas and on the temperature and solids content of the feed.

The temperature of the hot gas and the gas/feed ratio should be so selected that the temperature of the resulting mixed or combined stream will be between about 1000° F. and about 1800° F., preferably between about 1200° F. and about 1700° F.

Below this range satisfactory pyrolysis will not be obtained. Above it decomposition of the ammonia will be difficult to arrest.

As intimated above, the composition of the feed may vary somewhat in the solids content which may be anywhere from about 2% to 100% by weight. The advantages obtainable from the process are most marked when the feed is a liquid containing say 40% to 75% solids. However, the invention may be practiced using a finely divided solids feed obtained by evaporating the liquor at relatively low temperature (say 150° F. to 400° F.).

The material which is used for quenching the hot gases may be any available fluid which is inert under the conditions of temperature and pressure which it will encounter. Preferably water or an aqueous liquor is used. Usually between about 0.05 and about 5 pounds of quench liquor per pound of feed are used where this medium is water or an aqueous liquid. Other quenching materials such as oil may be employed if desired.

The pressure under which the pyrolysis is conducted may vary within wide limits. Advantageously a super-atmospheric pressure is used since this tends to suppress dissociation of the ammonia. The hot gases entering the pyrolysis conduit are normally at between 2 p.s.i.g. and about 300 p.s.i.g.

Following quenching, the gases may be treated in any convenient way for the removal and recovery of ammonia therefrom. In one embodiment of the invention this is done by passing the gases through a conventional wash box of the type customarily used in the manufactured gas industry for cooling and removal of tar. From the wash box, the gases may be sent through an electrostatic precipitator for the further removal of tar, and then through a conventional ammonia saturator.

The invention will be further described with reference to the drawing which is a schematic flow diagram of a preferred system for the pyrolysis of ammonia base waste sulfite liquor according to the invention.

Referring to the drawing, a pyrolysis system according to the preferred embodiment of the invention comprises a pyrolysis conduit 10, having an inlet 9 for hot gases, a first Venturi constriction 12 and a second Venturi constriction 13. A line 8 is provided for carrying hot gas from a source 7 to the inlet 9. A line 14 is provided for introducing feed material into the conduit 10 at the first Venturi constriction 12. Quench liquor is introduced into the conduit 10 at the second Venturi constriction from a line 19.

In operation, a high temperature gas such as steam or flue gas or a combination thereof is delivered from source 7 which may be a conventional burner or boiler, through a line 8 to the inlet 9 of conduit 10. The gas is at a temperature between about 1500° F. and about 4000° F. and at a pressure between about 2 and about 300 p.s.i.g. Moving down the conduit it enters the first Venturi constriction 12. At the constriction 12 a stream of the waste sulfite material to be pyrolyzed is introduced through line 14. The velocity of the hot gas in the first Venturi constriction is between about 200 and about 700 feet per second, and the impact of this high velocity gas atomizes the waste material. The extremely high resultant temperature of the combined stream, 1000° F. to 1800° F., preferably 1200° F. to 1700° F., is sufficient to cause breakdown of the lignin sulfonic acids and sugars to liberate ammonia, $SO_2$ and $H_2S$, and pyrolyze the carbonaceous portions of the ligneous material. After a total contact time of between about 0.01 and about 1.0 second, preferably between about 0.1 and about 0.5 second, the combined stream of hot gas and pyrolyzed waste material enters the second Venturi constriction 13. Here it is contacted with a quench liquid having a temperature of between about 50° F. and about 250° F. introduced through line 19. A sufficient amount of this material is added to reduce the temperature of the combined stream to less than 1000° F., say to between 500° F. and about 800° F. This effectively prevents dissociation of the ammonia and further decomposition of such hydrocarbonaceous materials as may be present.

The quenched gases are then delivered to an ammonia recovery system. Details of this system are not considered to be a part of the invention, and various designs may be employed. In the type shown in the drawing, the gases are passed first into a wash box 20 of the type customarily used in the manufactured gas industry. In the wash box gases are bubbled up through a body of water and are thus cooled to say 200° F. A major portion of the tar and other heavy materials present in the gas is thereby removed. From the wash box the gases preferably are delivered through a conduit 40 to a reheater 21 where they are raised in temperature to say 220° F. by means of low pressure steam. The heated gases then pass through a conduit 41 to an electrostatic precipitator 42 where the last quantities of tar are separated. After leaving the precipitator 42 the gases are delivered to an ammonia saturator system indicated generally as 22.

The saturator system shown in the drawing is a so-called spray type system. It will be understood, however, that any of the other types of saturator systems conventionally used in semi-direct coke oven by-product recovery plants may be employed instead.

Referring again to the drawing, the gases from the precipitator 42 are charged to a saturator 23 through a line 24. Moving upwardly through the saturator, the gases are met with a spray of a dilute acid, such for example as 1–10% by weight $H_2SO_4$. The ammonia in the gas reacts with the acid to form the corresponding salt, for example ammonium sulphate, which falls into the lower portion of the saturator and is withdrawn therefrom at 25 in the form of a slurry.

The gases, now freed of ammonia, are charged through a line 38 to an acid catcher 26 to remove entrained acid and sulfate crystals. Emerging from the acid catcher, the gases may be contacted with water, entering through line 27 to prevent salt incrustation in the acid catcher. The resulting mixture of water, salt and acid is returned through line 28 to the lower section of the saturator 23 where it functions to prevent incrustation of that part of the saturator.

The slurry removed from the saturator 23 at 25 is charged to a salt receiver 29 through a line 36. Here most of the water in the slurry is decanted and sent to a mother liquor overflow pot 30 through a line 45. The concentrated slurry remaining is delivered to a centrifuge 31 from the receiver 29 via a line 44, where most of the remaining water is removed to give $(NH_4)_2SO_4$ product at 32.

A stream of water is charged to the centrifuge 31 through line 33 to remove acid remaining on the crystals. The liquid effluent from the centrifuge is delivered to the mother liquor overflow pot 30 through line 34. Acid is also added to the pot 30 through a line 35. Mixed liquor from the pot 30 is charged to the saturator 23 through line 46. To prevent incrustation in the top of the saturator water is introduced through lines 37 and 39.

The gases emerging from the acid catcher 26 through line 43 are now free of ammonia and may be treated for the recovery of sulphur, or other constituents, or wasted, as desired.

The invention will be further described with reference to the following specific example, it being understood that the example is given for illustration only, and is not to be taken as in any way limiting the invention beyond the scope of the claims.

*Example*

Using the system shown in the drawing, 140,000 lbs. per hour of a flue gas consisting chiefly of $CO_2$, $CO$, $H_2O$, N₂ and about 1% oxygen at 3600° F. and 10 p.s.i.g., are introduced into the conduit 10 at 9. 113,000 pounds per hour of an ammonia base waste sulfite liquor containing 50% solids are introduced through line 14. The solid component of this material has a proximate analysis (percent by weight dry basis) as follows:

| | |
|---|---|
| Volatile matter | 65 |
| Ash | 1 |
| Fixed carbon | 34 |
| | 100 |

After leaving the Venturi constriction 12 the combined stream has a temperature of about 1500° F. It is sent through the second Venturi constriction 13 and at this point 72,000 pounds per hour of water having a temperature of about 160° F. are injected as a quench medium, and the stream is quenched. The total time for pyrolysis, from the point of introduction of the feed at 12, to quench at 13 is about 0.3 second. The temperature of the stream emerging from the second Venturi constriction 13 is 600° F. This quenching stream is then passed to the recovery and separation apparatus.

The quenched stream, exclusive of quenching water, may be described as follows:

| | Lbs. per hour |
|---|---|
| Fixed gases (from pyrolysis) | 22,000 |
| Ammonia | 2,100 |
| SO₂ | 7,600 |
| Oils | 4,800 |
| Carbon residue | 15,000 |
| Water (from pyrolysis) | 5,000 |
| | 56,500 |

This stream is delivered to the ammonia recovery system whence about 7000 pounds per hour of crystalline (NH₄)₂SO₄ are recovered.

What is claimed is:

1. A process for the pyrolysis of ammonia base waste sulfite liquor which comprises mixing said liquor with a stream of gases having a velocity between about 200 and about 700 ft./sec. and a temperature between about 1500° F. and about 4000° F. and thereby atomizing and pyrolyzing said liquor and forming a combined stream of hot gases and atomized liquor having a temperature between about 1200° F. and about 1700° F., and then quenching said combined stream to give a product stream containing recoverable ammonia and oils, the total time between mixing said liquor with said gases and quenching said combined stream being between about 0.01 and about 1.0 second.

2. The process claimed in claim 1 in which the time of contact between the liquor and the gases prior to quenching is from about 0.1 to about 0.5 second.

3. A process for the pyrolysis of ammonia base waste sulfite material containing from about 2% to about 100% by weight solids which comprises mixing said material with a moving stream of gases having a temperature between about 1500° F. and about 4000° F. and a velocity between about 200 and about 700 ft./sec. there being between about 0.1 and about 10 pounds of hot gases per pound of waste material, thereby atomizing and carbonizing said material and forming a combined stream of hot gases and pyrolyzed material having a temperature between about 1200° F. and about 1700° F., and subsequently quenching said combined stream to below about 1000° F., to give a product stream containing recoverable ammonia and oils, the total time between mixing the material with the moving stream of hot gases and quenching the combined stream being between about 0.01 and about 1.0 second.

4. The process claimed in claim 3 wherein the period of contact between said gases and said material is between about 0.1 and about 0.5 second.

5. The process claimed in claim 3 and comprising quenching the combined stream by contacting said stream with an aqueous liquid.

6. The process claimed in claim 5 wherein between about 0.05 and about 5 pounds of aqueous liquid are employed per pound of material.

7. The process claimed in claim 3 wherein the waste sulfite material contains about 40–75% solids.

References Cited in the file of this patent
UNITED STATES PATENTS

| | | |
|---|---|---|
| 2,739,039 | Phelps | Mar. 20, 1956 |
| 2,767,233 | Mullen et al. | Oct. 16, 1956 |
| 2,816,941 | Goins | Dec. 17, 1957 |